United States Patent [19]

Collins

[11] 3,938,318

[45] Feb. 17, 1976

[54] WRIST WATCHES

[75] Inventor: Dean Robert Collins, Dallas, Tex.

[73] Assignee: Texas Instruments Incorporated, Dallas, Tex.

[22] Filed: June 8, 1973

[21] Appl. No.: 368,372

Related U.S. Application Data

[63] Continuation of Ser. No. 68,207, Aug. 31, 1970, abandoned.

[52] U.S. Cl. .................... 58/50 R; 307/38; 340/336

[51] Int. Cl.[2] ...................... G04C 19/02; H02J 3/14

[58] Field of Search ....... 58/23 R, 23 A, 50 R, 85.5; 307/38; 340/336

[56] References Cited

UNITED STATES PATENTS

| | | | |
|---|---|---|---|
| 3,560,998 | 2/1971 | Walton | 58/23 A |
| 3,613,351 | 10/1971 | Walton | 58/23 BA |
| 3,672,155 | 6/1972 | Bergey et al. | 58/50 R |
| 3,722,206 | 3/1972 | Bergey | 58/50 R |

*Primary Examiner*—Edith Simmons Jackmon
*Attorney, Agent, or Firm*—Harold Levine; Edward J. Connors, Jr.; Stephen S. Sadacca

[57] ABSTRACT

There is disclosed a battery powered wrist watch utilizing solid state circuits and a liquid crystal display to eliminate mechanical parts. Complementary metal oxide semiconductor (CMOS) devices are used to drive liquid crystal display cells. The liquid cells dissipate only microwatts of power when energized and the CMOS devices require appreciable power only when switching from one state to the other. The combination of the liquid crystal display with the CMOS driving circuitry provides a low power, compact, portable watch.

6 Claims, 7 Drawing Figures

INVENTOR
Dean Robert Collins

BY

WITNESS

ATTORNEY

WRIST WATCHES

This is a continuation of application Ser. No. 68,207, filed Aug. 31, 1970, which is now abandoned.

This invention pertains to wrist watches and, more particularly, to a solid-state battery-powered wrist watch utilizing a liquid crystal optical display driven by complementary metal oxide semiconductor (CMOS) circuitry.

Battery-powered wrist watches are known in the art. Conventionally, however, such watches involve mechanical parts which involve complex manufacturing and tuning techniques, which inherently require a certain amount of servicing due to wear, fatigue, etc. Further, such watches conventionally depict the time by means of hands pointing to positions on a dial. This manner of display of the time is often cumbersome and inconvenient, and a watch providing direct, digital readout of the time is desirable. One method for providing such a watch is to include an optical display in the watch.

Optical displays forming digital readouts are also well-known in the art. Such displays conventionally use devices such as light emitting diodes or Nixie tubes as the display element. These devices, however, require an excessive amount of power. As a result of the high power requirements of such light emitting devices and associated driving circuitry, it is neither economical nor technically practical to make a display in a compact, low power configuration that may be operated by a battery.

One approach that has been proposed in the art for providing a low power-consuming display utilizes liquid crystal display cells in conjunction with bipolar transistors and conventional integrated circuits for driving the display. While such a display system is an improvement over displays using light emitting diodes, for example, the bipolar transistors used in the driving and timing circuits continually dissipate an appreciable amount of power, severely limiting the lifetime of a battery powered display.

Accordingly, it is an object of the present invention to provide a low power, compact display system.

It is a further object of the present invention to provide a display system including in combination liquid crystal display cells driven by CMOS circuitry.

An additional object of the invention is to provide a battery operated wrist watch having a minimum number of mechanical parts.

Another object of the present invention is to provide a battery operated wrist watch having a liquid crystal display driven by CMOS timing and logic circuitry.

Briefly, and in accordance with the present invention, a low power, compact display system for a wrist watch comprises in combination liquid crystal display cells and CMOS timing, logic and driving circuitry. In the preferred embodiment, a free-running or crystal controlled multivibrator is used as a timing source to provide a reference frequency. A chain of CMOS divide by two logic gates is utilized to reduce the frequency of the pulses from the timing source to 1 pulse per second. These pulses are utilized to bias CMOS logic and driver circuitry to energize the appropriate electrodes of liquid crystal display cells to effect a digital readout of the time. If six liquid cells are used, the hours, minutes and seconds may be displayed. Additional cells could be added to display the year, day, etc.

The novel features believed to be characteristic of this invention are set forth in the appended claims. The invention itself, however, as well as other objects and advantages thereof, may best be understood by reference to the following detailed description of illustrative embodiments when read in conjunction with the accompanying drawings in which:

FIG. 1 pictorially depicts a display system in accordance with one embodiment of the present invention wherein liquid crystal display cells are mounted in the face of a wrist watch.

FIG. 2 schematically depicts a CMOS device that is operable in the timing, countdown, logic and driver circuits used in combination with the liquid crystal display cells;

Figure 2:
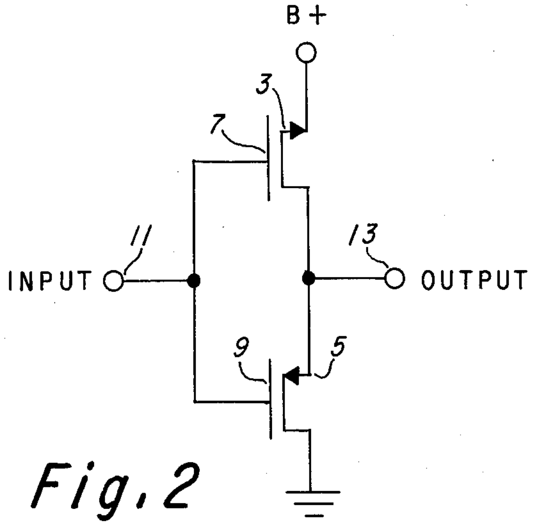

With reference to the drawing, there is a detailed description of one embodiment of the invention as it pertains to producing a compact, battery operated, low power digital display wrist watch. It is to be understood, of course, that the advantageous results obtained from combining CMOS driving circuitry and liquid crystal display cells in accordance with the present invention are not limited to the specific application hereinafter described. For instance, information could be displayed spatially rather than alpha-numerically. Other applications requiring low power, compact display systems will be apparent to those skilled in the art, such as a wall clock.

Figure 1:
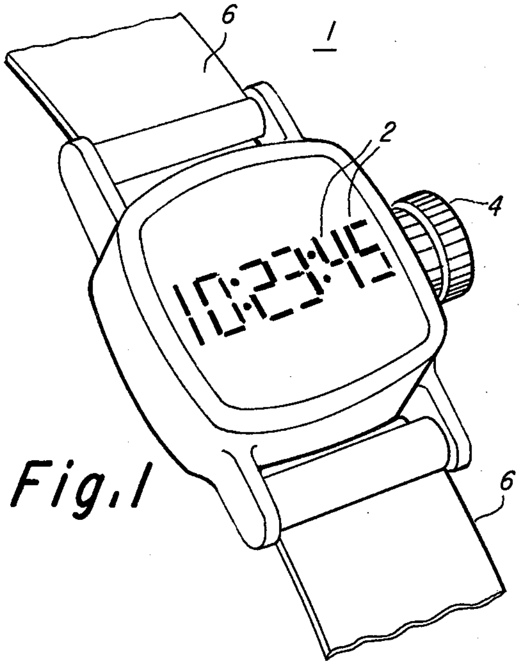

With reference to FIG. 1, a wrist watch incorporating the display system of the present invention is depicted at 1. The face 2 of the display comprises a plurality of liquid crystal display cells. As discussed in more detail hereinafter with respect to the description of FIGS. 3–5, each cell includes a plurality of electrodes arranged such that when selected electrodes are energized, a numeric readout is produced. for the embodiment shown in FIG. 1, the optical display of the wrist watch comprises six liquid crystal cells. Preferably, each cell comprises seven electrodes. The six cells respectively represent the hours, minutes and seconds. In FIG. 1, appropriate electrodes of the respective cells have been energized to effect a display of 23 minutes and 45 seconds past 10 o'clock. Means for setting the time for the watch are represented diagrammatically at 4 and will be described in more detail hereinafter with reference to FIG. 6. Batteries for providing power to the watch are preferably mounted in an area 6 of the watch band adjacent the body of the watch. It is to be appreciated, of course, that additional liquid crystal cells may be added to the display as described to display the year, day, etc. Since a seven segment cell can display letters as well as numerals, the day of the week could also be displayed.

Referring to FIG. 2, there is schematically depicted a CMOS device operable in the present invention. As understood by those skilled in the art, however, a CMOS structure is not limited to having an "oxide" layer; rather, any of a number of insulating materials may be used to separate the "metal" base and "semiconductor" channel. The CMOS device comprises a P channel, shown schamtically at 3, formed in series with an N channel, depicted schematically at 5. Metal gates, depicted at 7 and 9, are spaced apart respectively from the P and N channels by an insulating layer of a material such as silicon oxide. The silicon oxide is an extremely good insulator and therefore the gate draws very little power. Further, the CMOS device draws appreciable current only when it is switching from one state to the other, as, for example, when switching from conduction in the P channel to conduction in the N channel. Consequently, in steady state operation, the input 11 dissipates only picowatts of power, most of the power loss being attributable to device leakage currents.

As understood by those skilled in the art, the CMOS device operates in an enhancement mode. Thus, when a negative pulse is applied to the input 11, conduction is enhanced in the P channel 3, essentially short circuiting the B+ source to the output 13. Reversing the polarity at the input 11 enhances conduction in the N channel, essentially short circuiting the output 13 to ground, and changes the conductivity of the P channel such that it is essentially opencircuited.

When a CMOS device such as shown in FIG. 2 is used to drive a liquid crystal cell in accordance with the present invention, the B+ voltage is preferably about 10–20 volts since most liquid crystal compositions effectively exhibit dynamic scattering in this voltage range, although lower voltages may be used. The CMOS logic, countdown, and timing circuits, in accordance with the present invention, and as described hereinafter, may also be driven by the B+ voltage source. It may be desirable, however, when a battery is used as the B+ source, to drive the CMOS devices in these circuits from a lower voltage source, or from a tap of the B+ source, to reduce the leakage current of the CMOS devices and prolong the life of the battery. It may also be desirable to bias the liquid crystal display cell with a voltage slightly below the cell's threshold for dynamic scattering and use the CMOS output voltage to trigger the dynamic scattering effect.

CMOS devices and methods for fabricating same are known in the art. For example, reference H. C. Lin et al, "Complementary MOS — Bipolar Transistor Structure", *IEEE TRANS*, *Electron Devices*, Vol. ED-16, November 1969, pp. 945–951.

Figure 3:
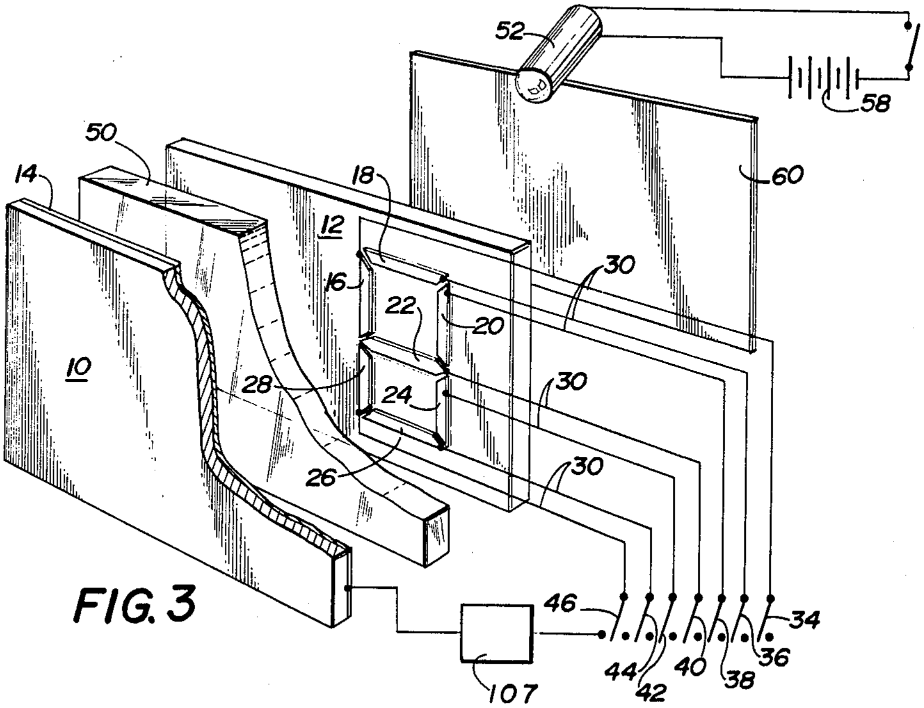
FIG. 3 is an exploded schematic view of a display cell operable with the present invention.

Referring to FIG. 3, a liquid crystal display cell operable with the present invention is depicted. Two spaced apart substrates or plates 10 and 12 are positioned substantially parallel to each other. Substrate 10, shown partially broken away, is optically transmissive and has deposited on a face thereof a coating 14 of a material which is optically transmissive and electrically conductive. In the embodiment of FIG. 3, the substrate 12 is also optically transmissive. A plurality of electrically insulated electrodes 16, 18, 20, 22, 24, 26, and 28 are formed on a surface of the substrate 12. These electrodes are also optically transmissive and electrically conductive. Each of the electrodes 16-28 has attached thereto a lead 30 which is optically transmissive and which has been electrically insulated by an optically transmissive insulating composition. The leads 30 are connected to switches 34, 36, 38, 40, 42, 44 and 46 which correspond respectively to specific ones of the electrodes 16-28. Switches 34–46 are connected in parallel to a driver source indicated generally at 107. The driver source comprises a plurality of CMOS devices similar to the device shown in FIG. 2. The driver circuitry is connected in series between electrically conductive coating 14 and switches 34–46 and is operable to connect a B+ voltage source between the coating 14 and selected electrodes 16–28 to effect a display of a number or a letter.

Interposed between substrates 10 and 12 is a thin layer 50 of a liquid crystalline composition that exhibits dynamic scattering in response to an electric field. For purposes of clarity in the exploded view of FIG. 3, the thin layer 50 is shown separated from the substrates 10 and 12; however, in operation, the thin layer 50 is intimately in contact with the coating 14 and the electrodes, such as 16–28, formed on the surface of the substrate 12. A light source 52 is positioned behind substrate 12 to direct a light beam to an angle toward the rear face of substrate 12. Since both substrates 10 and 12, including the electrodes and coating thereon, are optically transmissive, the light beam from source 52 normally passes through the display cell. The source of light 52 is electrically connected to a suitable electrical energy source 58, and may be any conventional source including an incandescent lamp. A non-reflective, light-absorbing plate 60, which is preferably dull black in color, is positioned behind and spaced from the substrate 12.

Figure 4:
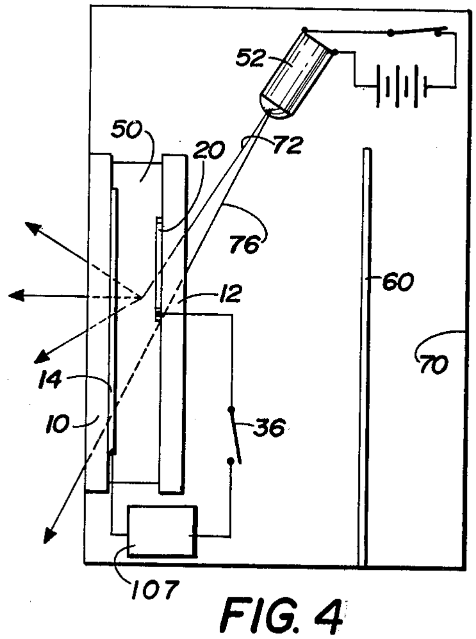
FIG. 4 is a side view of the display cell shown in FIG. 3.

Operation of the display device will be described with reference to FIG. 4, wherein there is depicted a side view of the display cell shown in FIG. 3. For clarity of description, only one electrode 20 of electrodes 16-28 is illustrated in FIG. 4. The display cell is enclosed by a suitable casing 70. As may be seen, the thin layer 50 of the liquid crystalline composition contacts the electrically conductive coating 14 and electrode 20. When switch 36 is closed, the driver source 107 is operable to impress a voltage across the layer 50 between electrode 20 and that portion of coating 14 corresponding thereto. This voltage causes the portion of layer 50 exposed thereto to diffuse the light coming from the light source 52. For purposes of illustration, the light beam 72 is shown being diffused toward the eye 74 of an observer. A second representative light beam 76 is shown passing through the portion of the liquid crystalline composition 50 across which no voltage is impressed. As may be seen, this light beam is not diffused and thus the observer is unable to see light from the light source in that portion of the layer. Plate 60 is provided to eliminate internal reflections from the light source 52 and also to eliminate stray room light which may interfere with the display characteristics of the display screen.

Referring back to FIG. 3, it may be seen that if switches 34 and 46 are energized by the driver source 107, a voltage will be impressed across layer 50 in that portion of the layer corresponding to electrodes 16 and 28. An observer, such as observer 74 of FIG. 4, will see a numeral 1 displayed. Similarly, if all of switches 34–46 are closed, the observer will see the numeral 8 displayed. Since light source 52 requires an appreciable amount of power, it is preferred that an embodiment be utilized wherein the ambient room light may be used to illuminate the characters of the display.

Figure 5:
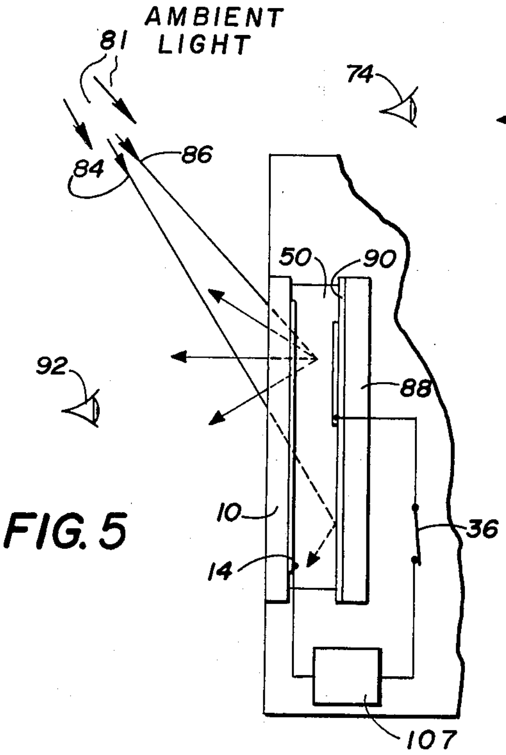
FIG. 5 is a side view of a different embodiment of a display cell operable with the present invention.

In FIG. 5, the preferred embodiment of the present invention is depicted, wherein ambient light, shown diagrammatically by arrows 81, comprises the light source of the display cell. In this embodiment, the optically transmissive substrate 10 and optically transmissive and electrically conductive coating 14 are constructed as described above. Representative light beams 84 and 86 of the ambient light source are shown impinging upon the liquid crystal composition 50. Here, the substrate 88 need not be optically transmissive. A reflective coating 90 is formed on the surface of the substrate 88 and an electrode, such as 20, is formed on the reflective coating 90. As above described, electrode 20 is electrically connected through switch 36 and the driver source 107 to the conductive coating 14. In operation, light beam 86 strikes the liquid crystal composition 50 in an area across which a voltage is impressed. The light beam 86 is diffused and is reflected back toward the observer 92 by the reflective coating 90. The light beam 84, however, does not traverse a portion of the layer 50 across which an electrical field is impressed, and is reflected by the coating 90 away from the observer 92. Thus, the observer will see a display corresponding only to the size and shape of the electrode 20.

In the embodiment shown in FIG. 1, six display cells as above described, respectively having electrodes such as 16–28 shown in FIG. 3, are utilized to provide a display of the hours, minutes and seconds. CMOS timing, countdown, logic and driver circuits index the appropriate display cells so that a continuous display of the correct time is effected. Alternately, switching means may be provided at the display such that the display cells are operative only when the switch is activated. Such an arrangement would save power and prolong the life of a battery operated display system.

Also, the power would not need to be continuously applied to the display cells since liquid crystals have a certain amount of retention, that is, they continue to exhibit dynamic scattering for a period of time after the voltage is removed. Thus, the electrodes could be strobed with a voltage, that is, the voltage could be applied intermittently, to effect a power savings. Additionally, it is known in the art to produce liquid crystals having a memory; that is, once an image is formed, it is retained without any maintenance power until erased with a certain signal. Utilizing these materials, a considerable savings in power could be effected in displaying infrequently changing cells, such as those representing the year, month, day, hour and minutes. Liquid crystals possessing the above mentioned characteristics are described, for example, in G. Heilmeier and J. E. Goldmacher, *Proc. of the IEEE*, 57, No. 1, January 1969, pp 34–38.

The electrical energy or impressed voltage across the layer 50 must be sufficiently large to reach or exceed the threshold voltage at which the liquid crystal composition will scatter light. It has been found that for layers having a thickness of about 1 mm, the threshold voltage for most compositions occurs at around 6 volts. Preferably, a voltage in the order of 20 volts is utilized. For best results, it has been found that the layer should be relatively thin, preferably less than about 1 mm. The substrates 10 and 12 may be comprised of any suitable material which is optically transmissive, for example, various types of glass, fused quartz, transparent varieties of corundum and transparent plastics or resins. The term optically transmissive is used for and includes both transparent and translucent materials. The coating and electrodes which are both electrically conductive and optically transmissive, such as coating 14 and electrodes 16–28, may be composed of layers of indium oxide or tin oxide deposited on the surface of the respective substrates. If a reflective surface is desired, a thin layer of metallic material, such as silver or aluminum, may be deposited on a substrate such as coating 90 on substrate 88. It is to be understood, of course, with reference to FIG. 5, that the reflective coating 90 may be placed either at the front or the rear of the substrate 88, but, if placed on the front of substrate 88, as shown in FIG. 5, it must be electrically isolated from the electrode 20 to give the desired display effect. An alternate means of producing the desired reflection is to eliminate the coating 90 and compose the electrode 20 of a suitable reflective and conductive material.

Liquid crystal compositions which may be utilized with the present invention are well known in the art. Such compositions may, for example, be comprised of thermotropic nematic liquid crystals, lyotropic nematic liquid crystals, mixtures of smectic and nematic liquid crystals, etc. Further examples of liquid crystals compositions suitable for use in the present invention are contained in U.S. patent application Ser. No. 16,078 filed March 3, 1975 entitled ELECTRO-OPTICAL DISPLAY DEVICES USING LYOTROPIC NEMATIC LIQUID CRYSTALS, now U.S. Pat. No. 3,690,745 issued September 12, 1972.

Figure 6:
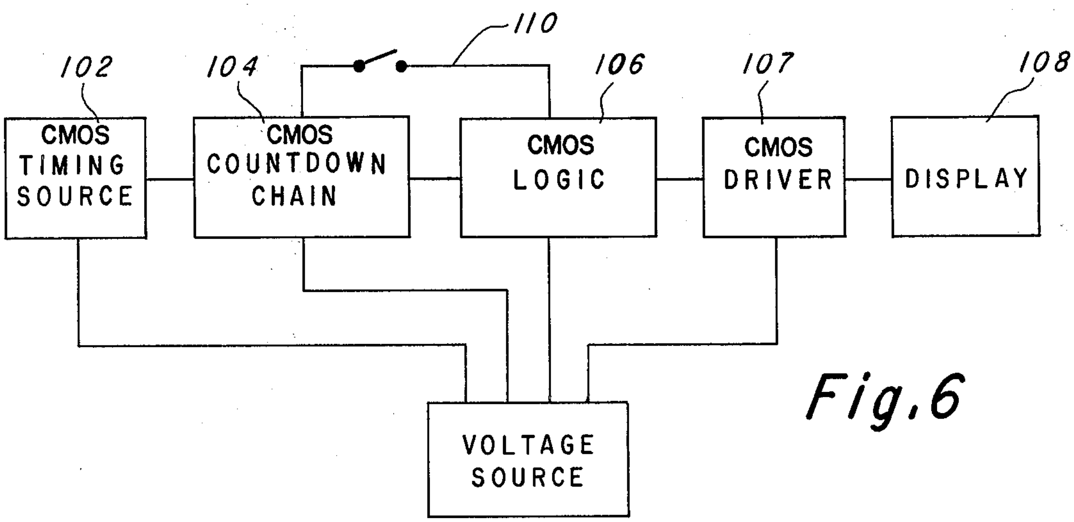
FIG. 6 depicts in functional block diagram format the display system of the present invention.

With reference to FIG. 6, the display system shown in FIG. 1 is depicted in functional block diagram. A timing source 102 provides a train of pulses establishing a fundamental operating frequency. In the preferred embodiment, the timing source 102 comprises a CMOS free-running multivibrator. Alternately, a more temperature-independent timing source may be comprised of a quartz crystal which may be bonded to the chip onto which the remaining circuitry of the display system is formed.

The countdown 104 comprises a chain of divide by two logic gates, to reduce the frequency of the timing source by an appropriate amount to reach the 1 second pulse rate required to drive the display 108. CMOS devices are also utilized in the countdown chain circuit to minimize power requirements. Countdown chains for reducing the frequency of a timing source to a preselected desired frequency are known in the art and therefore are not described in more detail herein.

The logic and driver circuits are formed using CMOS devices and function together to provide at the proper time, a voltage to the appropriate electrodes of the respective cells of display 108. In operation, the logic circuitry would, for example, reset the hour to 1 upon receipt of the next count pulse after the count reaches 12. The driver portion of the circuitry would apply the required voltage across the appropriate electrodes of the cells to effect the optical display. Logic circuits operable with the present invention are also well known in the art.

In the preferred embodiment the display system of the present invention is incorporated into a wrist watch. Means are provided to set the display. These means are depicted schematically at 110 and may, for example, be provided by appropriate bypass switches which index the respective display cells at, for example, one numeral per second until the desired numeral is displayed.

Figure 7:
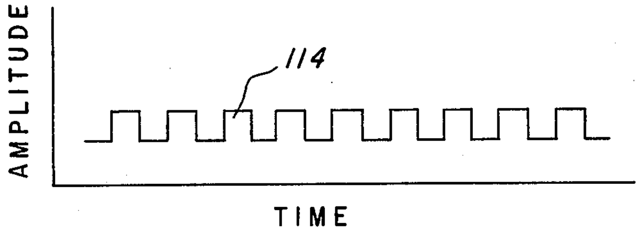
FIG. 7 depicts a typical train of pulses generated by the timing source of FIG. 6.

In operation, the timing source 102 produces a train of pulses 114 as shown in FIG. 7. After being processed by the countdown chain 104, successive pulses occur at 1 second intervals. These pulses are applied to the logic and driver circuits 106 and 107 which operate to index the appropriate electrodes of respective display cells of the display 108. A display system as above described requires approximately 0.05 to 0.16 milliwatts of power. Conventional liquid crystal compositions as previously referenced herein exhibit dynamic scattering with an applied voltage of about 20–30 volts, and draw approximately 1 microamp per square centimeter. Hence, the maximum power dissipation for a seven electrode display cell is about 30 microwatts, assuming that the seven electrodes have a total area of one square centimeter. Thus, a display constructed using six such seven-segment display cells would draw the most current when displaying the time 08:08:08 and would dissipate about 160 microwatts of power. If 11:11:11 were displayed, then only about 51 microwatts would be dissipated resulting in an average power dissipation of about 0.05 to 0.16 milliwatts of power. The entire CMOS timing, logic and driver circuitry would only draw on the order of 150 microwatts of power. Hence, the entire CMOS circuitry and six cell display would dissipate only about 300 microwatts of power and conventional batteries provide sufficient power to operate such a display system for at least one year.

Although a specific embodiment of the present invention has been described herein, it will be apparent to a person skilled in the art that various modifications to the details of construction shown and described may be made without departing from the scope of the invention.

What is claimed is:

1. A timing device comprising in combination:

a case, a plurality of liquid crystal display cells mounted in said case, each cell comprising a pair of spaced-apart substrates and a film of liquid crystalline material interposed therebetween, at least one of said substrates being optically transmissive and having an optically transmissive and electrically conductive layer formed on one surface thereof, the other substrate having first and second major surfaces on opposite sides thereof, a plurality of electrodes formed on said first surface of said other substrate, said plurality of electrodes being arranged to effect a preselected display in response to energization of selected ones thereof, light generating means positioned within said case for directing light upon said cells, a voltage source connected to said light generating means for energization thereof, and CMOS circuit means within said case and operable to apply an electric field between selected electrodes of each of said cells and said electrically conductive layer to thereby cause said liquid crystalline material between said selected electrodes and said electrically conductive layer to scatter light emanating from said light generating means, said CMOS circuit means including a timing source operable to produce a chain of pulses defining a reference frequency, a countdown chain of CMOS divide by two logic gates electrically connected to said timing source and operable to reduce said reference frequency to a preselected pulse rate, a CMOS logic circuit electrically connected to the output of said countdown chain, said logic circuit being operable to select according to a preselected pattern the appropriate electrodes of said cells required to be energized in order to effect a display of the desired information, and a CMOS driver circuit electrically connected to the output of said logic circuit and operable to apply a voltage from said voltage source across the liquid crystalline material between electrically conductive layers and selected electrodes indexed by said logic circuit.

2. A wrist watch comprising in combination:

a case, a plurality of liquid crystal display cells mounted in said case, each of said cells being defined by a plurality of discrete electrodes formed in a pattern to produce a display in response to energization of selected ones of said electrodes, said electrodes requiring on the order of one microamp of current per square centimeter for display, a battery mounted in said case, means for selectively connecting said electrodes to said battery for connecting a first voltage potential thereto, and a timing system mounted within said case and requiring on the order of 150 microwatts of power or less, said timing system comprising a quartz crystal timing source and CMOS circuit means operable to apply an electric field across selected electrodes of said plurality of cells to effect a continuous display of the time, said CMOS circuit means including a countdown chain circuit, a logic circuit and a driver circuit, and said CMOS circuit means being connected to said battery and operably responsive to a second voltage potential of lower potential than said first voltage potential.

3. A wrist watch as set forth in claim 2, wherein there are six liquid crystal display cells and wherein each cell comprises seven discrete electrodes patterned to produce an alpha-numeric display, and at least selected ones of said cells including means for enabling display for a substantial period of time subsequent to removal of drive voltage therefrom.

4. A timing device comprising in combination:

a case, a plurality of liquid crystal display cells mounted in said case, each cell comprising a pair of spaced-apart substrates and a film of liquid crystalline material interposed therebetween, at least one of said substrates being optically transmissive and having an optically transmissive and electrically conductive layer formed on one surface thereof, the other substrate having first and second major surfaces on opposite sides thereof, a plurality of electrodes formed on said first surface of said other substrate, said plurality of electrodes being arranged to effect a preselected display in response to energization of selected ones thereof, said electrodes requiring on the order of one microamp of current per square centimeter of display area, light generating means positioned within said case adjacent said second surface of said other substrate for directing light therethrough at a selected angle to the plane defined by said second surface, a voltage source connected to said light generating means for energization thereof, complementary metal oxide semiconductor circuit means within said case and operable to apply an electric field between selected electrodes of each of said cells and said electrically conductive layer to thereby cause said liquid crystalline material between said selected electrodes and said electrically conductive layer to scatter light emanating from said light generating means, said complementary metal oxide semiconductor circuit means requiring on the order of about 150 microwatts of power and including a quartz crystal timing source operable to produce a chain of pulses defining a reference frequency, a countdown chain of complementary metal oxide semiconductor divide by two logic gates electrically connected to said quartz crystal timing source and operable to reduce said reference frequency to a preselected pulse rate, a complementary metal oxide semiconductor logic circuit electrically connected to the output of said countdown chain, said logic circuit being operable to select according to a preselected pattern the appropriate electrodes of said cells required to be energized in order to effect a display of the desired information, and a complementary metal oxide semiconductor driver circuit electrically connected to the output of said logic circuit and operable to apply a voltage from said voltage source across the liquid crystalline material between electrically conductive layers and selected electrodes indexed by said logic circuit.

5. A wrist watch as set forth in claim 3, including switching means operably connected to said countdown chain and said logic circuit for selectively setting said display cells to produce a display of a predetermined value.

6. A timing device as set forth in claim 1, wherein said timing source is a quartz crystal.

* * * * *